(12) United States Patent
Srinivasan et al.

(10) Patent No.: US 9,640,085 B2
(45) Date of Patent: May 2, 2017

(54) SYSTEM AND METHOD FOR AUTOMATED CONTENT GENERATION FOR ENHANCING LEARNING, CREATIVITY, INSIGHTS, AND ASSESSMENTS

(75) Inventors: Raman Srinivasan, Chennai (IN); Priyadharshini Sridhar, Chennai (IN); Swarna Srinivasan, Chennai (IN)

(73) Assignee: TATA CONSULTANCY SERVICES, LTD., Mumbai (IN)

( * ) Notice: Subject to any disclaimer, the term of this patent is extended or adjusted under 35 U.S.C. 154(b) by 413 days.

(21) Appl. No.: 12/776,399

(22) Filed: May 9, 2010

(65) Prior Publication Data
US 2011/0217685 A1     Sep. 8, 2011

(30) Foreign Application Priority Data
Mar. 2, 2010   (IN) ........................... 543/MUM/2010

(51) Int. Cl.
G09B 7/00      (2006.01)

(52) U.S. Cl.
CPC ...................................... G09B 7/00 (2013.01)

(58) Field of Classification Search
CPC ............................................... G06F 17/30864
USPC ........... 434/322, 323, 350–352, 362; 705/11; 707/104.1; 706/12
See application file for complete search history.

(56) References Cited

U.S. PATENT DOCUMENTS

| | | | |
|---|---|---|---|
| 6,424,979 B1 * | 7/2002 | Livingston et al. ......... 715/206 |
| 6,978,115 B2 * | 12/2005 | Whitehurst et al. ......... 434/350 |
| 7,237,189 B2 * | 6/2007 | Altenhofen et al. ......... 715/201 |
| 7,377,785 B2 * | 5/2008 | Ullman ..................... G09B 7/02 | 434/323 |
| 7,413,442 B2 * | 8/2008 | Okunishi et al. ............. 434/323 |
| 7,437,309 B2 * | 10/2008 | Magrino ................. G06Q 10/06 | 705/7.14 |
| 8,676,828 B1 * | 3/2014 | Agarwal ............. G06F 17/2247 | 705/14.4 |

(Continued)

OTHER PUBLICATIONS

RSS Feed, Wilkipedia[online],[retrieved on Dec. 6, 2012]. Retrieved from the Internet: URL<http://http://en.wikipedia.org/wiki/RSS.*

*Primary Examiner* — Robert J Utama
*Assistant Examiner* — Sadaruz Zaman
(74) *Attorney, Agent, or Firm* — Akerman LLP; Mammen (Roy) P. Zachariah, Jr.

(57) ABSTRACT

The present invention provides an automated system for multiple types of knowledge content generation for enhancing learning, creativity, insights and assessments comprising the means of: Capturing one or more contents; Storing the captured contents in raw content database; Classifying the captured content by one or more means of selected from Bookmarking or annotating, Using meta information from the content source files, Using algorithms to classify information and Receiving feedback from users and user interaction with content; Defining content template; Specifying rules and algorithms for automatic generation of knowledge content; Finally, Using the generated knowledge content by means of a display to candidate. Invention reduces the manual effort and time taken to create the multiple types of knowledge contents as well as reduce the cost for creation of the multiple types of knowledge contents.

14 Claims, 3 Drawing Sheets

(56) References Cited

U.S. PATENT DOCUMENTS

| | | | |
|---|---|---|---|
| 2002/0103876 A1* | 8/2002 | Chatani | G06F 17/30864 709/217 |
| 2002/0198766 A1* | 12/2002 | Magrino et al. | 705/11 |
| 2003/0050931 A1* | 3/2003 | Harman | G06F 17/30905 |
| 2003/0129573 A1* | 7/2003 | Bowers | G06F 11/3684 434/350 |
| 2004/0264811 A1* | 12/2004 | Yano | G06F 17/30011 382/306 |
| 2005/0019740 A1* | 1/2005 | Cunningham | G09B 7/02 434/350 |
| 2006/0014129 A1* | 1/2006 | Coleman et al. | 434/322 |
| 2006/0078863 A1* | 4/2006 | Coleman | G09B 7/02 434/322 |
| 2006/0194187 A1* | 8/2006 | Saito | G09B 7/02 434/353 |
| 2007/0020603 A1* | 1/2007 | Woulfe | G09B 5/08 434/350 |
| 2007/0271205 A1* | 11/2007 | Aravamudan | G06F 17/30035 706/12 |
| 2010/0151431 A1* | 6/2010 | Miller | G09B 7/00 434/350 |
| 2011/0055189 A1* | 3/2011 | Effrat | G06F 17/3064 707/706 |
| 2011/0065082 A1* | 3/2011 | Gal | G09B 7/02 434/365 |
| 2012/0066256 A1* | 3/2012 | Ramamurthi | G06F 17/30893 707/771 |

\* cited by examiner

SYSTEM AND METHOD FOR AUTOMATED CONTENT GENERATION FOR ENHANCING LEARNING, CREATIVITY, INSIGHTS, AND ASSESSMENTS

BACKGROUND

Field of the Invention

The present invention generally relates to a content generation system and method. More particularly, it relates to an automated system and method for multiple types of knowledge content generation for enhancing learning, creativity, insights and assessments.

Description of Related Art

Creativity is often said to be sparked by subconscious processing of information, when the mind is able to process information, observe abstract ideas, patterns and trends, and make novel connections. In today's world of information and sensory overload, processing and retaining information takes a backseat as information is available almost instantaneously at our fingertips. The myriads of articles available on the web require us to skim through them at high speeds, leaving no time to remember, process and make connections.

Learning and assessment in this age also becomes a challenge as cognitive processes go through subtle changes to cope with the demands imposed in the age of information technology. It also becomes more important to be able to engage in the interests of learners.

Facilitators of learning need to seize the power that technology brings with it to store and retrieve available information at high speeds and combine it with the unique expertise that only they can bring to the field of learning, to make learning fun and relevant for the learner and to make their work meaningful and efficient. They must in equal measure use these to try and foster an environment that encourages creativity.

This requires an automated and flexible process for facilitators to create multiple types of content from different sources, and to write specifications on how they can be combined and recombined to generate content automatically so that can either enhance learning or creativity.

Enabling learning and assessment of an ability, skill or knowledge among individuals has been a requirement in academics and the industry. The aim of education in schools, undergraduate and graduate courses, is to enable students to learn different concepts, analyze and apply them creatively in real-world situations.

In certain situations, assessments are done on large scale and should be comparable and consistent across space and time. In other occasions, the learning and assessment are done among a small group of people. For example, sometimes, the items present in certain assessment systems tend to get exposed to a group fast and needs to be tracked over and replenished in order to maintain the standards that the assessment should pose in front of a new person to be assessed.

Also the content used for assessment is required to be contextually relevant and should capture the interest of the group of examinees taking the exam. Hence, content that one comes across in daily life needs to be captured, annotated, indexed, and updated automatically from multiple sources in different forms including text, audio, video content from sources such as RSS and video feeds, online magazines, journals etc. for assessment.

Assessment content creation is hence a specialized task and requires the time and effort of experts. These tasks can be made more efficient if the power of the human mind worked in synergy with the memory and processing power of a system.

Certain types of automated systems for generating content exist. Electronic content search, assimilation and grading of multiple-choice problems have existed for years. However, such systems suffer from the problems that the content is entirely generated by human effort, so, to avoid the enormous effort of creating customized content for each user; all users are generally given the same set of content in an assessment which raises the possibility of answer sharing, etc.

Attempts to address the said problems find mention in the art wherein computer aided content creation has been major areas of research.

U.S. Pat. No. 7,377,785 discloses a system and method for generating and administering classroom exercises to a student. One or more root questions are generated, where each root question has a stem, a plurality of right answers, and a plurality of wrong answers. A multiple-choice question instance is created by combining the stem with a set of answer choices that are created from one of the right answers and one or more of the wrong answers. The questions are administered to a student. Preferably, the sets of questions based on the same root questions are administered one or more times to the student—e.g., a student may be required to work three sets of question instances based on the same set of root questions, or may be required to continue working new sets of question instances until all of the questions in one set are answered correctly. The key distinguisher of the aforementioned invention is that helps students practice and learn concepts by providing them with multiple training cases and guiding feedback which is specified against each wrong option in the question.

U.S. Pat. No. 7,494,340 discloses a memory that stores a plurality of first data structures, which includes element specific data objects indicating a classification of at least one of the plurality of segments of the test definition language, and second data structures, which include attribute specific data objects indicating at least one attribute of the segments of the test definition language implemented by a computer. A method for computer-based testing includes authoring a test specification and content of the at least one test using a test definition language, compiling the test specification and content of the at least one test to create a compiled test specification and content, which includes validating the test specification and content, storing the compiled test specification and content to a resource file, and retrieving the compiled test specification and content from the resource file during delivery of the test.

Thus, the above-mentioned methods and systems have not been able to satisfactorily address the problems related to aggregating, classifying, templatization and rendering multiple types of content.

The present invention also ensures that the content generated can be both entirely random and unique, without any redundancy and can also ensure standardization and homogeneity of the content as required. The present invention, as outlined in this patent disclosure, is neither covered nor anticipated by teachings of prior art.

In order to solve the above problems this invention proposes an automated system and method for multiple types of knowledge content generation for enhancing learning, creativity, insights and assessments.

Other features and advantages of the present invention will be explained in the following description of the invention having reference to the appended drawings.

SUMMARY

The principle object of the present invention is to provide an automated system and method for multiple types of knowledge content generation for enhancing learning, creativity, insights and assessments.

An object of the invention is to provide a mechanism to collect, classify, disaggregate, store, generate, use and improve knowledge content in ways such that they can be used to enhance learning, creativity, insights and assessments.

Another object of the invention is to reduce manual effort and time taken to create the multiple types of the knowledge content as well as reduce the cost for creation of the multiple types of knowledge contents.

In another object of the invention is to capture content comprising text, audio, video or image from sources, which comprises Internet, Intranet, computer readable media and databases.

Yet another object of the invention is to store the captured content in raw content database on a computer readable medium.

In yet another object of the invention is to annotate, index, bookmark various stages of the lifecycle of the contents so that they can be reused and repurposed for use in different applications such as assessment content, story content, bibliographic content, literature survey content, etc.

A still another object of the invention is to disaggregate the captured content logically into constituent parts to provide a multidimensional representation of content.

Yet another object of the invention is to classify the content, using the meta-information available in the file formats such that, they support incorporation of meta-information.

It is yet another object of the invention that the content is classified in a reusable ontology using automatic learning techniques.

Yet another object of the invention is to define a virtual container, which is a content specification template. It defines the structure to aggregate and hold multiple types of content. It specifies what content, how, when and where they will be displayed.

Yet another object of the invention is to define rules and algorithms to generate content, check for relevance and validity of the generated knowledge content. Examples of these rules and algorithms in the context of item generation could be a method to solve for the correct answer, a method to generate multiple distracters, a method to check if answers evaluated are the same, a method to check for negative numbers, or a method to check if the text is longer than 200 words. Examples of these rules and algorithms in the context of test paper generation may be a method to check if the test is standardized, if the test information function is as desired.

Another object of the invention is to be able to define these rules in a simple manner, such that these methods can be reused as rules in different forms of content generation such as assessment content, dream content, story content, bibliographic content, literature survey content.

Yet another object is to define the set of rules for the content which can be described in a digitally packaged data structure such that these rules can render different types of stored content according to the specification template, to produce valid assessment content, dream content, story content, bibliographic content, literature survey content, etc. and the container further enables creation of test comprising standardized items for assessment of knowledge.

Another object of the invention is to render the different types of content using the content generating rules and algorithms and the specifications of the container and to display them in appropriate modes as specified to the candidate.

Yet another object of the invention is to send the feedback of recorded content usage statistics and contexts to the central server to improvise and improve the quality of content generation. For example, in the context of item, feedback could be the user's responses to the items. In the context of dream content, usage could be the user's interaction with the content.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

Before the present methods and systems, are described, it is to be understood that this invention in not limited to the particular methodologies, systems and hardware described, as these may vary as per the person skilled in the art. It is also to be understood that the terminology used in the description is for the purpose of describing the particular versions or embodiments only, and is not intended to limit the scope of the present invention which will be limited only by the appended claims.

The present invention provides an automated system and method for multiple types of knowledge content generation for enhancing learning, creativity, insights and assessments.

Figure 1:
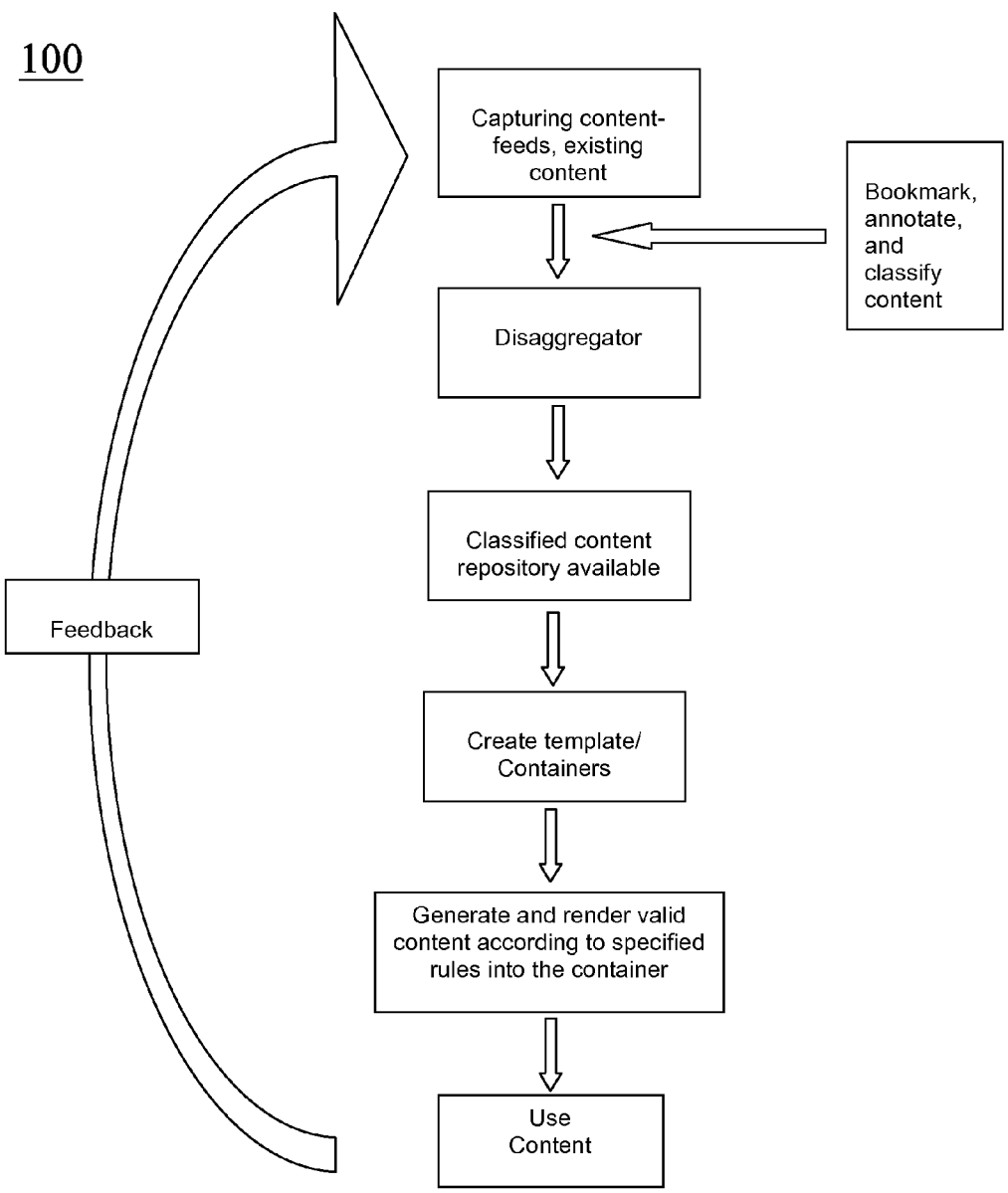
FIG. 1 shows an automated system for multiple types of knowledge content generation for enhancing learning, creativity, insights and assessments according to various embodiments of the invention.

FIG. 1 shows an automated system and method for multiple types of knowledge content generation for enhancing learning, creativity, insights and assessments (100) according to various embodiments of the invention. Initially, the system captures the content in various forms which include texts, audio, video content from sources such as Internet, Intranet, computer readable media, databases including but not limited to RSS and video feeds, online magazines, journals and internal learning content, etc, wherein the contents are captured by one or more central servers in the system. The above said RSS feeds from various web sources may be subscribed to provide text content, audio, video and image content. For example the technology feeds are obtained from internal and external technology blogs such as CTO's blog; Joel on Software, technology articles, blogs, science, business, art feeds from sources such as the New York Times, Economic Times etc.; and generic, crowd-sourced, pre-processed (tagged and annotated) feeds from social bookmarking tools such as diigo; live streams sent out by people and organizations on twitter. Contents are captured from APIs, Various social bookmarking websites, Desktop contents and Web content, etc. Once the content is captured and then it is stored in a raw content database on a computer readable medium by the system.

According to one embodiment of the invention, the system may capture and store one or more contents in various file formats which include Jpeg, mp3, mp4, html, xml, doc, xls, ppt, pdf, txt, exif files etc. The said formats support storing of meta information about the content. Meta information formats such as xml? for images contain fields that allow storage of huge amounts of data that persist along with the file on transfer across networks and machines. This metadata formats help immensely in classification of the files and contents.

Once the contents are captured and stored by the system, in next step, the system disaggregates the contents using disaggregator by the following way: the contents are broken up into constituent parts by using logical mechanism which enables reuse and re-representation of content in a variety of ways. For example a web page will be broken down into constituent paragraphs, images, related text or a journal article is broken down to the abstract, conclusions and references. The list of references across a selected domain eventually goes towards building a bibliography of references for that domain. Disaggregation of captured contents provides a multidimensional representation of knowledge content, whose components can be brought together in a variety of ways.

In next step, the system classifies the captured content in different ways; by bookmarking and annotating, by using meta information from the content source files, by using algorithms to classify information and by receiving feedback from users and user interaction with content.

According one embodiment of the invention, captured contents are classified in a reusable ontology using automatic learning technique. As the user interacts with the content, associating the content with individual constituents of the item, the information about the usage context is captured. This information provides sufficient data for the system to automatically group and hence to suggest frequently occurring associations of contexts and concepts, using supervised or automatic learning techniques. These are further used for content classification and provided as suggestions to the user the next time a similar context is required.

According to one embodiment of the invention, for the classification of the content, the system may use the meta-information available in the file formats of the captured content are such that, they support incorporation of meta information.

According to one embodiment of the invention, the system classifies the content by bookmarking and annotating. For example, a set of articles, images and videos is tagged using one of the above mentioned methods as people, Business, retail, India. This classification is collected over huge samples of data to help an expert curator create a more sophisticated ontology of possible classifications in the domain of interest. The creation of ontology is thus domain-specific and context sensitive.

According to one embodiment of the invention, the system classifies the content by receiving the feedback from the users and user interaction with content. The system stores classified knowledge content in the repository (for eg: computer readable medium).

In next step to the classification of the content, the system defines the content template to hold different combination and types of content, wherein the system defines a virtual container, which is a content specification template, wherein the virtual container defines the structure to aggregate and hold multiple types of content and also It specifies what content, how, when and where they will be displayed. Further the container enables creation of test comprising standardized items for assessment of knowledge.

In next step, the system specifies the rules and algorithms for automatic generation of valid knowledge content. According to one embodiment of the invention, the system defines rules and algorithms that are used to generate knowledge content, check for relevance and validity of the generated knowledge content.

According to one embodiment of the invention, the system defines rules and algorithms in simple manner, such that these methods can be reused as rules in different forms of knowledge content generation which includes assessment content, dream content, story content, bibliographic content, literature survey content, etc.

According to one embodiment of the invention, the system defines the set of rules for the content which can be described in a digitally packaged data structure such that these rules can render different types of stored content according to the specification template, to produce valid assessment content, dream content, story content, bibliographic content, or literature survey content.

In next step, the system renders the different types of content using the content generating rules, algorithms and the specifications of the container and displaying them in appropriate modes as specified to the user.

According to an exemplary embodiment of the invention the container of the system may enable rendering different types of classified contents and to produce dream content, story content, bibliographic content and a literature survey content, etc.

According to one embodiment of the invention, generated knowledge content is used in various situations by means of a display of the system to users in appropriate modes.

In next step, the usage information is sent to the central server by the system for further classification, calibration, evaluation and improves the content generation process.

According to one embodiment of the invention, the system sends the feedback of recorded knowledge content usage statistics and contexts to the central server to improve the quality of knowledge content generation.

According to one embodiment of the invention annotating, indexing or bookmarking various stages of the lifecycle of the contents, so that they can be reused and repurposed for use in different applications which comprising assessment content, story content, bibliographic content, or literature survey content.

According to one exemplary embodiment of the invention, the knowledge content is assessment content that can be used for assessments in large scales. Once an expert models the assessment content by specifying the template and rules, the system is capable of generating numerous instances of assessment content automatically.

According to one exemplary embodiment of the invention, the system generates an item that can be used for assessments in large scales.

Figure 2:
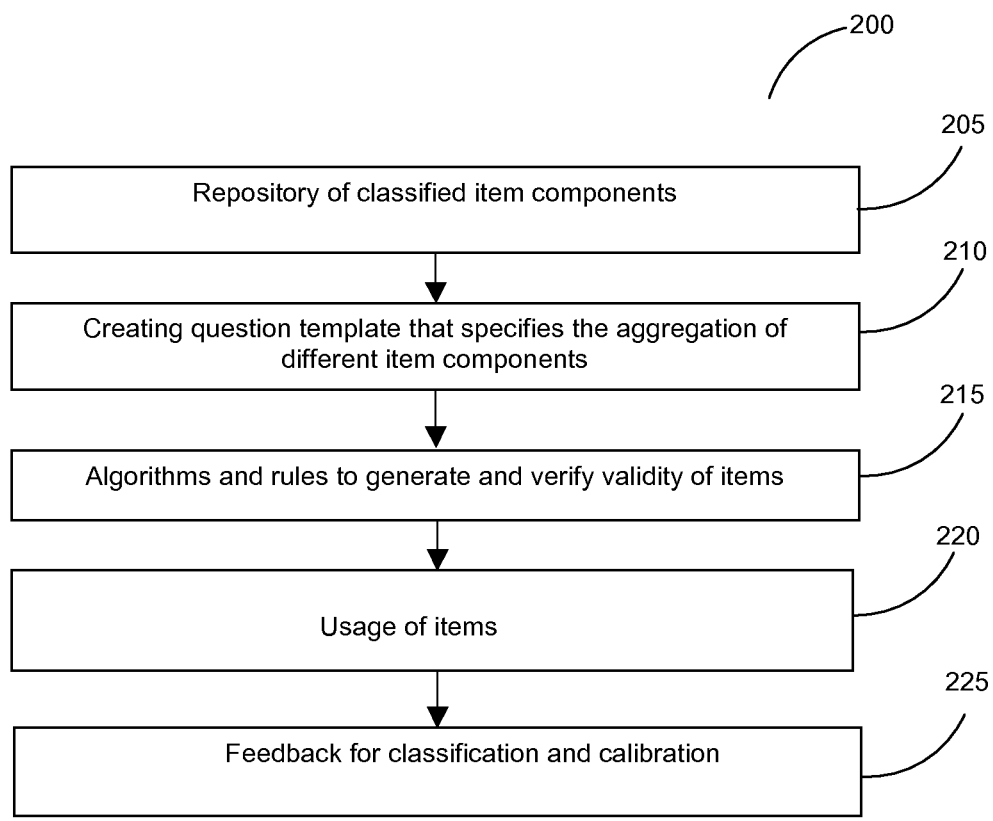
FIG. 2 is a flow chart illustrating a method for creation of item according to various embodiments of the invention.

FIG. 2 is a flowchart illustrating a method of creation of an item (200) according to various embodiment of the invention. In first step (205), the different components of an item are classified into a repository. Examples of item components maybe the textual context around which the item is framed, the images associated with the item, the algorithm associated with obtaining a solution to the item etc. In next step (210), the item template is created. The item template will specify details about what item components and quantities the item will contain. In next step (215), it will specify algorithms to determine how these components can be combined and verified, to generate a valid item. For example, the item may be a multiple choice item belonging to the analytical reasoning category. The item may have a item text with a number of options and an algorithm and rules to obtain the correct and wrong answer choices, Once the item template is specified, the item components are aggregated, generated and verified according to the specification. A completely rendered item may have a textual context, an image, a correct and multiple wrong options. In next step (220), these items are used on the field, in final step (225), usage and information obtained from the usage is further used to calibrate and classify items and its constituent components.

According to one embodiment of the invention, the item template that are generated, are stored as a custom data structure that may be TXML or XML.

Figure 3:
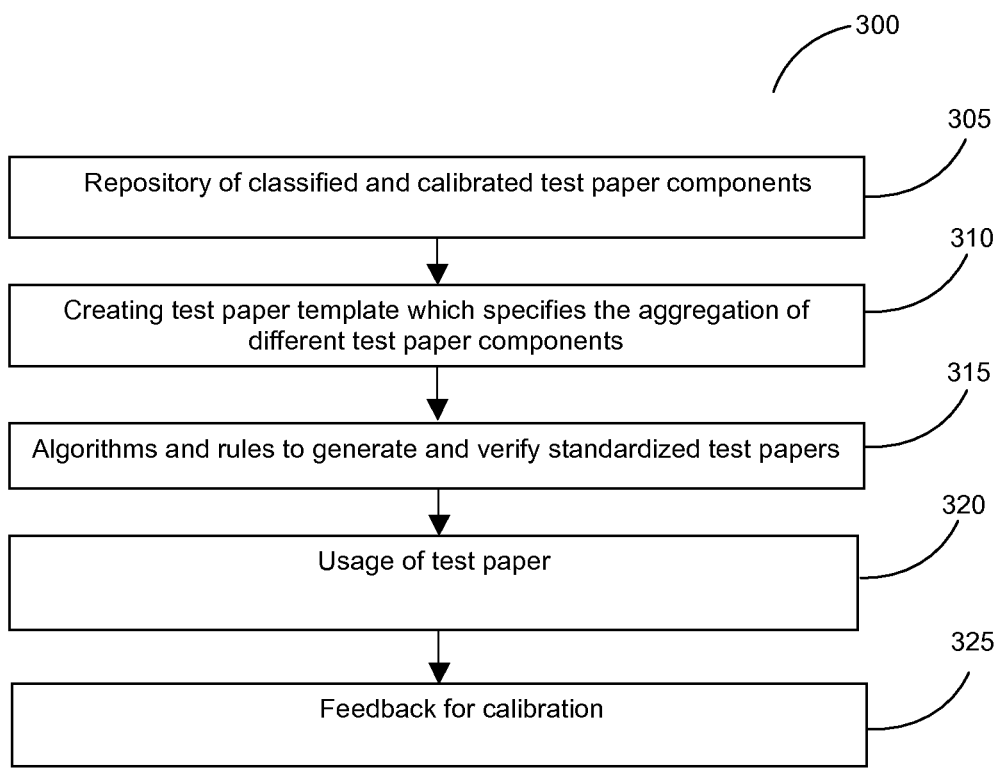
FIG. 3 is a flow chart illustrating a method for the creation of the test paper according to various embodiments of the invention.

FIG. 3 is a flow chart illustrating a method for creation of the test paper according to various embodiments of the invention. In step (305), a repository of classified and calibrated items is maintained by the system. In next step (310), the test paper is created by the system. A test paper template contains specifications about the type of test paper, the duration of the paper, the evaluation methods and the kinds and quantities of items the test paper will contain. In next step (315), it will also specify algorithms and rules according to which a standardized test paper containing items will be generated and verified against. In next step (320), the test paper is then used on the field and in Final step (325), information obtained is further used to provide feedback to help better classify the test paper and its constituent components.

According to one exemplary embodiment of the invention, the system generates two or more test papers that may have questions catering to an audience in the railway domain, while in another, the questions maybe in the context of banking.

According to one exemplary embodiment of the invention, the system generates two or more test papers that can be used for assessments in large scales. Once an expert takes the trouble of specifying the template and rules, the system is capable of generating numerous instances of the two or more test paper automatically. For example two test papers will contain questions in such a way that, only the problem statements may differ, but the knowledge used to solve the problem remains the same.

The invention is described in the example given below which is provided only to illustrate the invention and therefore should not be construed to limit the scope of the invention.

Some tasks can be performed more efficiently by machines while some tasks are best left to experts. A machine for example has an unsurpassable capacity to store information and retrieve it quickly. A human, however can perform cognitive tasks such as finding meaning, analyzing structures, connecting concepts and taking decisions based on multiple factors. The power of the system can be used in conjunction with what a human can do well, to obtain a very efficient system of creating assessment content for assessing a large scale of examinees. Creation of assessment content consists of creation and review of items and test papers. The steps involved in the generation of assessment content are described in below.

When multiple users of the system interact with real-world content on the internet or on their computer terminals, they can view, bookmark, annotate and save content using the mouse and the keyboard. For example, when the users browse the web for their daily dose of business, science or technology related news, they come across content such as a table or a chart depicting an interesting business trend. The user is aware that this information could be valuable when performing the task of creating assessment content. Hence the user annotates, saves and tags this content with relevant information such as "arithmetic", "growth trend" or "percentage", in order for him to retrieve the content when performing the task of creating the content. The content saved may also contain meta information such as credits, creation date etc. and this information is also retained.

At the time of content creation, the system presents the user with a set of existing assessment content, its classification details, along with useful statistical information such as the distribution of number of questions by difficulty level or the distribution of question in each class of problems such as "arithmetic", "measurement" and "volume of 3D object". The content can also be filtered according to numerous search criteria to view the content of interest.

System presents the user with the existing assessment content so that he can perform minor modifications on this content to create an entirely new question. When this action is performed, the classification details of all but the modified constituents of the original item, is retained, thus automatically establishing a relationship between the items.

Instead of creating content similar to other existing content, the system also allows creation of a new item container. This is done by specifying details about the item required to be generated. Using the information available, the user can decide to create new content for a specific purpose. The user specifies the type of an item, the context, the concept, domain to be assessed, the answer options, and the other specifications in the system. The content maybe used to measure a certain skill or area of knowledge such as arithmetic ability and volume of 3D objects. The content may for example, require to be used to test the ability amongst students taking the railway entrance exam.

In an exemplary embodiment, the system allows the user to browse through a list of saved content that could be of relevance to the railway industry. The content is automatically suggested based on existing items that were used in a similar context, or retrieved as the user performs a query operation. The system also allows the user to modify the content and the classification as he interacts with the content.

The user disaggregates the selected context into constituent parts. He might identify parts of the question as variables, and identify its type as an integer. He may identify a variable and classify it as an Indian city adding to the possible values that an Indian city can take. Some of these constituents identified maybe crucial constituents to finding the solution to the problem; these may also be used just to set the context of the question.

As the user interacts with the content, associating the content with individual constituents of the item, the information about the usage context is captured. This information provides sufficient data for the system to automatically group and hence to suggest frequently occurring associations of contexts and concepts, using supervised learning techniques. These are further used for content classification and provided as suggestions to the user the next time a similar context is required.

The user, after specifying the container, and marking the constituents of the item, specifies rules for automatic generation and verification of the item. The system allows user to identify and model a solution, in the form of an algorithm to solve and generate many instances of the problem, perhaps by providing an algorithm to calculate the correct answer. These algorithms may use parts of the information of the item constituents as inputs. The system allows user to write add rules and algorithms through an interface to test the validity of the generated questions. The system allows user to specify that an answer cannot be a plural value, an answer cannot take a negative value and the word train is always associated with a speed in the range greater than 100 kmph and less than 200 kmph.

These rules and algorithms are stored as a library of reusable functions in the system. Since they are also associated with a question and question constituents, frequently occurring association of rules and item constituents can be found and suggested to the user. For example, an item containing the word speed is associated with only a certain kinds of formulas.

Once the rules for automatic generation and verification of item content is specified, many instances of the item content are generated according to the specified rules. These are presented to the end user who could be a candidate taking the assessment.

The candidate answers the item and the interaction of the candidate with the item along with the instance of the item is captured. The captured information for a group of candidates is calibrated. This helps obtain more information on the properties of the item such as the difficulty of the item etc.

A sample item is provided below.

---

In ph1 years, from ph2 to ph3, a car rental company, ph4's annual revenues went up to ph5 ph11 from ph6 ph12 ph7. There is a projected ph8% growth in ph9. What is the projected revenue in the year ph10?
Framework identifier: PLAN4
Classification: Arithmetic, Number properties and operations, percentage
Difficulty: Easy
Discrimination: Low
Context: Business, cars
Sample rules for the item are described below:
Correct answer: ph8*ph5/100
Ph1-> time, quantity, number of years
integer
>3 & <8
Ph2-> time, year
integer
>1990 & < 2005
Ph3-> time, year
integer
>PH1 & <2005
PH4-> Company, cars
String
{Zipcar, Hertz}
Ph5 -> money, quantity, million
integer
>100 & <500
Ph6 -> money, quantity
integer
>1 & <10
Ph7 -> money, unit, currency
string
{dollars, rupee}
Rules: If ph7 =rupee, then ph5 = ph5*50/10
If ph7 =rupee, then ph11=crore
Ph8->quantity, percentage
integer
>5 & <30
Ph9-> time, year
integer
=Ph3 + 1
Ph10-> time, year
integer
=Ph9
Ph11-> unit, number
string -continued {Million, crore}
Ph12-> unit, number
=ph11

---

The generated assessment content appears as follows:

In six years, from 1996 to 2002, a car rental company, Zipcar's annual revenue's went up to 230 million from 9 million dollars. There is a projected 20% growth in 2003. What is the projected revenue in the year 2003?
Correct answer: 276.00 million While the principles of the disclosure have been illustrated in relation to the exemplary embodiments shown herein, the principles of the disclosure are not limited thereto and include any modification, variation or permutation thereof.

What is claimed is:

1. A method for generating knowledge content for enhance learning, insights, and assessments, the method comprising:

capturing, by a processor, content from a server, wherein the content is captured in dissimilar formats, and wherein the dissimilar formats are jpeg, mp3, mp4, html, xml, doc, xls, ppt, pdf, txt or exif, and wherein the dissimilar formats facilitate storing meta information pertaining to the content;

disaggregating, by the processor and by using a logical mechanism, the content into a plurality of constituent parts, wherein a constituent part of the plurality of constituent parts is attributed to one or more domains, and wherein the disaggregating the content facilitates multi-dimensional representation of each constituent part to enable a reuse and a re-representation of the constituent parts in a variety of ways;

classifying, by the processor, the constituent part of the plurality of constituent parts in a reusable ontology by using bookmarking and annotating, the meta information pertaining to the content, user feedback, and user interaction with the content;

creating dynamically, by the processor, a content template including virtual containers to hold one or more constituent parts of the plurality of constituent parts, wherein the content template is created by a set of rules, and wherein the set of rules specifies a type of the one or more constituent parts to be displayed, a time of the one or more constituent parts to be displayed, and a place in the content template where the one or more constituent parts are displayed;

generating dynamically in real time, by the processor, numerous instances of a specified type of the knowledge content based on the set of rules and one or more logical techniques by varying the type and value of the one or more constituent parts in multiple ways and representing the one or more constituent parts in a specified mode, wherein the one or more constituent parts are treated as variables, and wherein the numerous instances are generated utilizing the content template having the plurality of constituent parts there within such that usage of computer resources is reduced, and wherein each instance of the numerous instances is unique; and automatically displaying, by the processor, the numerous instances of the knowledge content.

2. The method of claim 1, wherein the content is selected from a group consisting of text data, image data, audio data, and video data.

3. The method of claim 1, wherein the content is further selected from a group consisting of an XML feed and a RSS feed.

4. A system for generating knowledge content, the system comprising:
- a memory that stores instructions; and
- a processor that executes the instructions to perform operations, the operations comprising:
  - capturing content from a server, wherein the content is captured in dissimilar formats, and wherein the dissimilar formats are jpeg, mp3, mp4, html, xml, doc, xls, ppt, pdf, txt or exif, and wherein the dissimilar formats facilitate storing meta information pertaining to the content;
  - disaggregating, by using a logical mechanism, the content into a plurality of constituent parts, wherein a constituent part of the plurality of constituent parts is attributed to one or more domains, and wherein the disaggregating the content facilitates a multi-dimensional representation of each constituent part to enable a reuse and a re-representation of said constituent parts in a variety of ways;
  - classifying the constituent part of the plurality of constituent parts in a reusable ontology by using bookmarking and annotating, the meta information pertaining to the content, user feedback, and user interaction with the content;
  - creating dynamically a content template including virtual containers to hold one or more constituent parts of the plurality of constituent parts, wherein the content template is created by a set of rules, and wherein the set of rules specifies a type of the one or more constituent parts to be displayed, a time of the one or more constituent parts to be displayed, and a place in the content template where the one or more constituent parts are displayed;
  - generating dynamically in real time, numerous instances of a specified type of the knowledge content based on the set of rules and one or more logical techniques by varying the type and value of the one or more constituent parts in multiple ways and representing the one or more constituent parts in a specified mode, wherein the one or more constituent parts are treated as variables, and wherein the numerous instances are generated utilizing the content template having the plurality of constituent parts there within such that usage of computer resources is reduced, and wherein each instance of the numerous instances is unique; and
  - automatically displaying the numerous instances of the knowledge content.

5. The system of claim 4, wherein the content is further selected from a group consisting of an XML feed and a RSS feed.

6. The system of claim 4, wherein the content selected from a group consisting of text data, image data, audio data, and video data.

7. The system of claim 4, wherein the content captured is stored in a raw content database.

8. The method of claim 1, wherein the content template storing the one or more constituent parts in at least one of a TXML format or XML format.

9. The method of claim 1, wherein the specified type of the knowledge content comprises assessment content, dream content, story content, bibliographic content, and literature survey content.

10. The system of claim 4, wherein the specified type of the knowledge content comprises assessment content, dream content, story content, bibliographic content, and literature survey content.

11. The method of claim 1, further comprises mapping the content template with at least one of one or more contexts, one or more concepts, and one or more domains associated with the knowledge content.

12. The system of claim 4, further comprises mapping the content template with at least one of one or more contexts, one or more concepts, and one or more domains associated with the knowledge content.

13. The method of claim 11, wherein the mapping of the content template with the one or more contexts, the one or more concepts, and the one or domains is further used to automatically group the one or more constituent parts and to suggest frequently occurring associations of the one or more contexts and the one or more concepts, using supervised learning techniques.

14. The system of claim 12, wherein the mapping of the content template with the one or more contexts, the one or more concepts, and the one or domains is further used to automatically group the one or more constituent parts and to suggest frequently occurring associations of the one or more contexts and the one or more concepts, using supervised learning techniques.

* * * * *